Dec. 2, 1952 — M. M. LEAR, JR — 2,620,081
ELECTRICAL WIRING BOX
Filed Oct. 13, 1950 — 2 SHEETS—SHEET 2
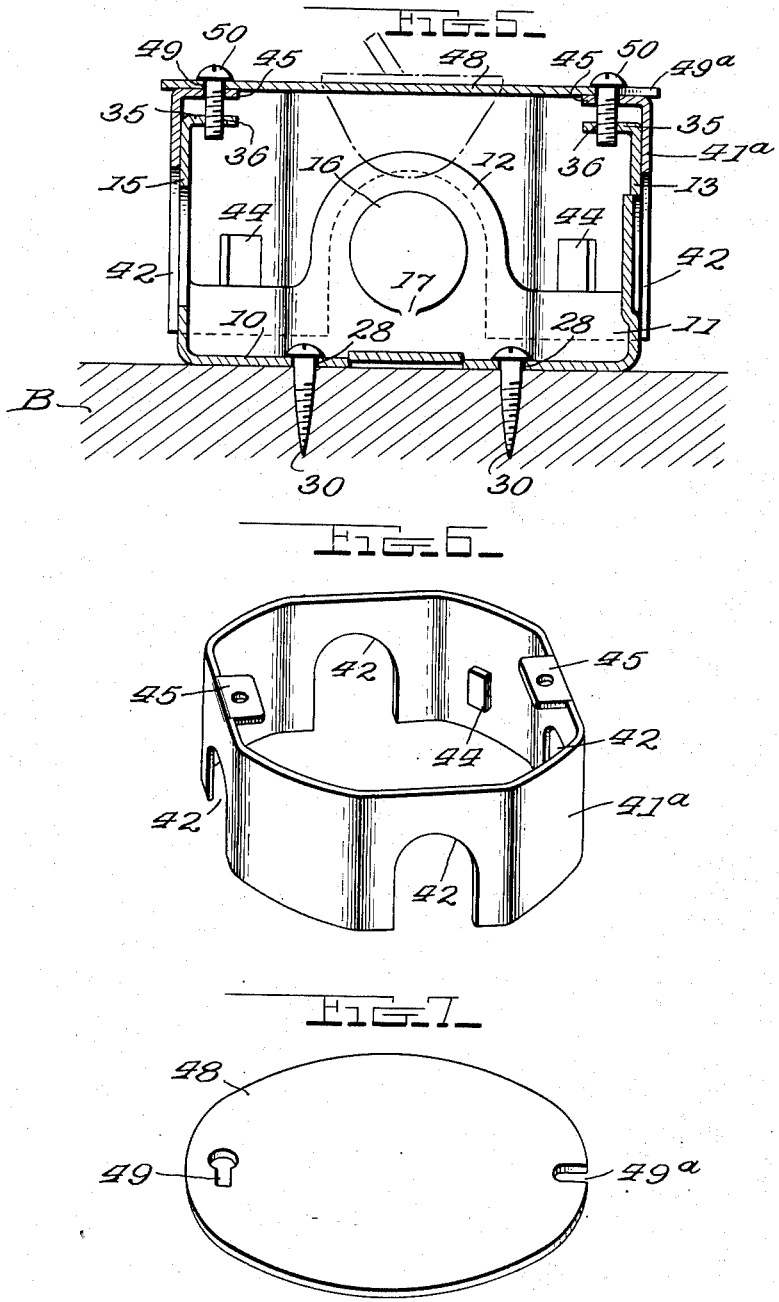
INVENTOR
Max M. Lear, Jr.
BY Mason, Porter, Diller & Stewart,
ATTORNEYS Patented Dec. 2, 1952

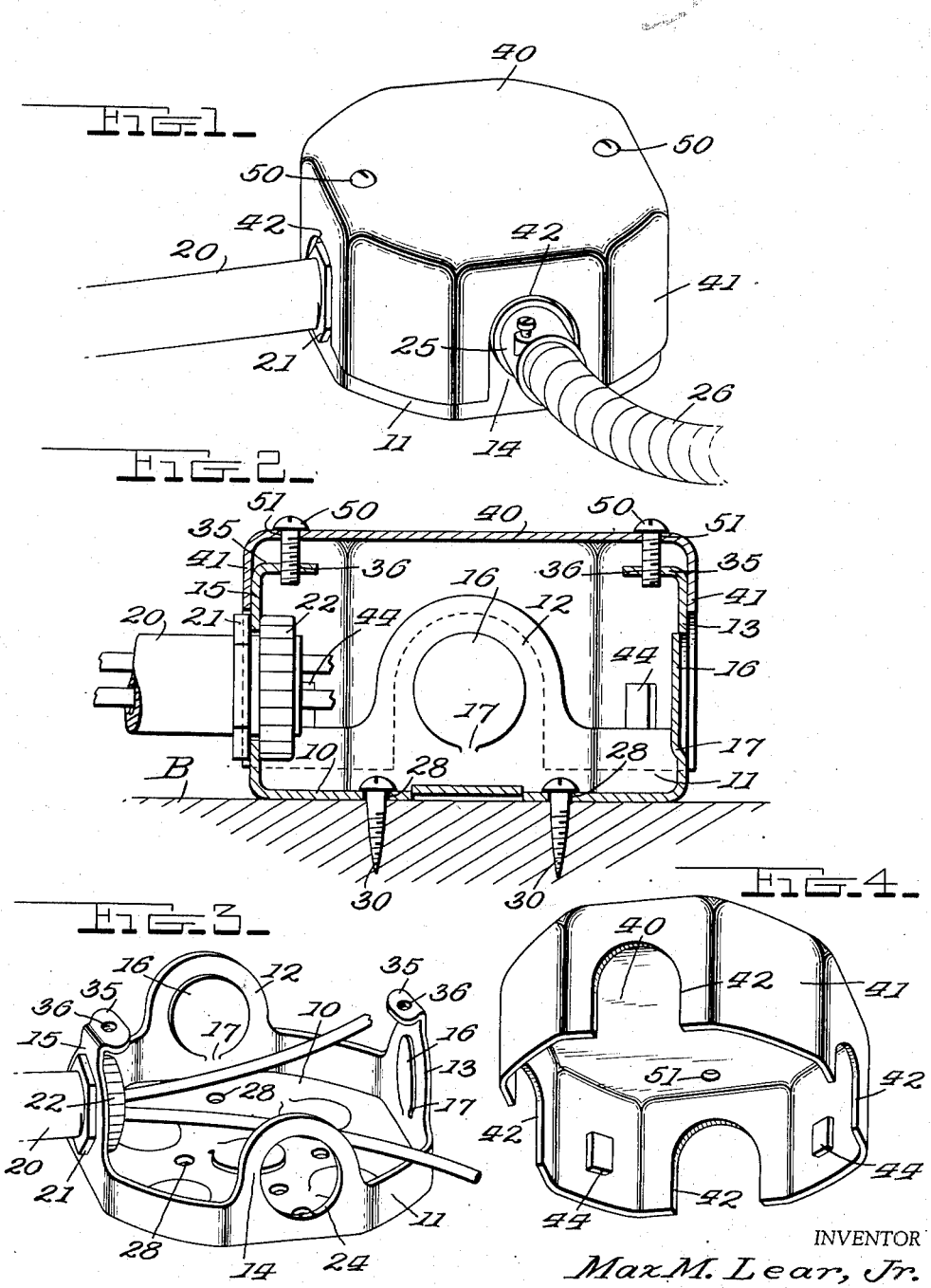

2,620,081

UNITED STATES PATENT OFFICE 2,620,081

ELECTRICAL WIRING BOX

Max M. Lear, Jr., Jamestown, N. Y., assignor to Monarch Fuse Co., Ltd., Jamestown, N. Y., a limited partnership of New York Application October 13, 1950, Serial No. 190,026

7 Claims. (Cl. 220—3.8)

This invention relates to an assembly of an electrical wiring box, and concerns a box structure in which the wire terminals are readily accessible.

One of the features of the invention is the provision of a wiring box comprising a base member and a cover member; with the base member including parts for receiving surface runs of conduit and holding the same in rigid relation while affording easy access to the wires, and the cover member including parts for closing the base member against accidental contact with said wires and against mechanical damage to the contents of the box.

A further feature is the provision of a wiring box comprising a base member and a cover member, which in the assembled condition are held rigidly together and which in disassembled condition permit free access to the wires contained in the base member without requiring loosening of conduit connections for the purpose of access.

With these and other features and objects in view, as will appear in the course of the following specification and claims, illustrative forms of practice of the invention are shown in the accompanying drawings, in which:

Fig. 1 is a perspective view showing the box in assembled and closed condition, connected to two conduit pipes;

Fig. 2 is an upright sectional view of the device of Fig. 1;

Fig. 3 is a perspective view, showing the cover member of Fig. 1 removed;

Fig. 4 is a bottom view of the cover member of Fig. 1;

Fig. 5 is an upright sectional view of a modified arrangement;

Fig. 6 is a top view of the sleeve element of Fig. 5; and

Fig. 7 is a top view of the cover plate element of Fig. 5.

In electrical conduit wiring, a required and permitted practice is to provide protection for the electrical wires by the so-called wiring boxes which may include outlets for lights, receptacles, switches, or which may have blind covers and serve merely for joining several runs of conduit. Such boxes have in the past been constructed with rigid walls extending around the same, wherewith there is difficulty in disposing the wires and their connections within the box, and of inspecting the connections made; or the conduits are not rigidly held to the box structure until a cover member has been positioned and clamped for the purpose. The term "conduit" is herein employed as inclusive of the use of rigid or pipe conduit, flexible conduit such as armored conduit, BX, and fabric-covered electrical cables.

In the illustrative form of this invention, as shown by Figs. 1 to 4, the wiring box comprises a base member, Fig. 3, and a cover member, Fig. 4. The base member has a bottom 10 and a peripheral flange 11 in this illustrative form, this flange having upstanding projections 12, 13, 14, 15 which are illustratively located in two diametrically opposite pairs 13, 15 and 12, 14, with the flange 11 having a generally external octagonal form. Each of the projections 12, 13, 14, 15 is provided with an aperture which in the illustrative form is provided for the projections 12, 13 by the usual stamping operation so that a disk or button 16 is severed from the projection for the major part of its periphery, remaining connected only at a narrow neck or bridge 17: this is sometimes called a "punch out," as the electrician can strike the disk 16 and force it from position, and then remove it by breaking the neck 17. This leaves an aperture through which may be introduced, for example, a length of rigid conduit pipe 20, with employment of the outer lock nut 21 and the inner bushing 22 in customary fashion, thus rigidly connecting the conduit to the base member. Likewise, an opening provided by removing the "punch out," such as the opening 24 of the projection 14, may receive the connector 25 for a run of flexible conduit 26, thereby binding the end of the conduit rigidly to the base member. Between these projections, the base member is notched so that the rim of the flange 11 is below the centers of the apertures.

The bottom 10 of this base member may also be provided with punch-outs, and has apertures 28 through which may be passed screws 30 for rigidly fixing the base member on a part of the building being wired, illustratively the board B.

At least one, and preferably at least two of the projections on the base member are provided with inturned ears 35 which have threaded apertures 36 therein, the axes of these apertures being parallel to the general axis of the base 10 and the flange 11.

The cover member, Fig. 4, has a top closure wall 40 and an integral peripheral skirt 41, this skirt being of octagonal form and having a slightly larger internal size than the external size of the flange 11 and the co-planar projections thereof in the illustrative base member of Fig. 3. This flange 41 of the cover member has notches 42 which extend from the free edge thereof and have a width less than the width of the projections 12, 13, 14, 15 of the base member, but larger than the standard dimensions of lock nuts 21 and connectors 25 which are used for securing the conduit to the base member.

Internally, the parts of the skirt flange 41, located between the notches 42, have lugs 44 which have their lower edges spaced upwardly from the free edge of the skirt.

Thus, both the base member and the cover member have notches, which are spaced peripherally relative to one another, so that a notch in the base member is opposite a closing wall in the cover member, and a notch in the cover member is opposite an apertured wall portion of the base member.

In employing such a wiring box, the bottom 10 of the base member is positioned against the support B, for example, and the runs of conduit are rigidly connected to the base member. The bottom 10 may be secured to the base member either before or after the conduit runs are connected, as most convenient to the electrician. Where the conduit has the wire already present within the sheath, as with BX cable, the ends of the wire can be passed across the box and through the spaces between the projections. With pipe conduit, for example, the wires may be introduced after the connection of the conduit to the base member and the securing of the base member to the board B, and it will be noted that there is free access to the ends of these wires as they come forth from the conduit, and that the spaces between the projections permit cross illumination. Thus, the position of the upper edge of the flange 11 permits the wires to extend through the spaces between the projections, essentially in the plane of the centers, and even below the plane of the centers of the holes in these projections. The electrician thereby has easy access to these wires, and they may be stripped and connected at ends which extend outside of the area of the bottom 10. These connected wires are then bent into form to fit within the space defined by the projection, and the cover member is applied, sliding it downward over these projections, with the notches 42 passing the conduit connections until the free edge of the skirt overlaps the flange 11, as shown in Fig. 2. Screws 50 are then passed through the apertures 51 in the closing portion of the cover member and engaged in the threaded ears 35 of the base member, and drawn tight until the lugs 44 are seated on the free edge of the flange 11 for limiting further relative axial movement of the parts.

It will be noted that when it is desired to make further connections at the box, or to inspect the wiring, the screws 50 can be withdrawn, and the cover member removed, thus giving access to the wiring in the base member, and the wires can be bent outwardly and their directions quickly and easily traced.

In the modified form shown in Figs. 5 to 7, the identical illustrative base member is employed, in the same fashion as before, the change being in the structure of the cover member which is in this modification made with a separate sleeve, Fig. 6, providing the skirt portion 41a having notches 42 therein, and provided on its interior with the lugs 44. This skirt is thus open at both ends, except for the provision of the inturned apertured ears 45 which are located diametrically opposite one another and have their apertures spaced to correspond to the diametrically opposed ears 35 on the base member.

With this sleeve construction of the skirt portion, a cover plate 48 can be employed, such cover plate being of the shape and size now standard in the industry, with switch, receptacle, or other mounting thereon as illustrated by the toggle switch in Fig. 5, or a blank cover as shown in Fig. 7. This cover member has an aperture shown as a keyhole peripheral slot 49 and also an edge notch 49a. The parts in this modified construction are employed by assembling the base member to the conduit system as before, connecting the wires, and then sliding the sleeve-like skirt 41a over the outside of the projections of the base member, to the position shown in Fig. 5, and passing the screws 50 through the apertured ears 45 and engaging them loosely in the threaded ears 35. The cover plate 48 can then be slipped beneath the heads of the screws 50, in the usual manner, and the screws tightened down. It will be noted that in this modified form, an inspection can occur by loosening the screws 50 and removing the cover 48, wherewith the permitted inspection is similar to that with a standard box; and that in addition the screws 50 can be removed and the skirt 41a pulled away from the base member, wherewith the wires are exposed even at sides of the box, and can be opened out into the plane of the holes 24, as before.

In this preferred arrangement, the electrical wiring box can be employed the same as the standard octagonal box of like dimensions. The illustrative form has four integral projections upstanding from the bottom of the base member and spaced at 90° from one another about the axis of this bottom, with each of the projections having a hole which may be initially closed by the "punch out" and is effective to rigidly receive a conduit connection, two diametrically opposite projections having inturned ears with threaded apertures for the securing means. In one form, the cover member has integral closing and skirt portions, the skirt portion having notches for passing around the conduit connections which have been rigidly made to the base member, while in the modified form the skirt portion is a sleeve and the closing portion can be a standard plate now available in the industry for a box of the specified size. The operations of employing the box, making connections, and closing it are obvious to the electrician upon inspection.

It will be noted that the final internal volume of the assembly is determined by the cover member, and the electrician may have several such members of the same cross-sectional outline and arrangement at the lower end of the skirt 41, 41a, but differing in wall height. Thus, for connection of a couple conduit runs, or for a single service outlet, the height of the skirt 41, 41a may be closely that of the projections on the base member; while for a general wiring center, or in the event of the later addition of additional conduit runs, the same base member is employed, with a cover member having a greater skirt height. This simplifies and reduces the labor of selecting and installing parts.

It is obvious that the invention is not limited to the illustrative forms shown, but may be employed in many ways within the scope of the appended claims.

I claim:

1. An electrical wiring box comprising a base member and a cover member; the base member having a bottom with a peripheral upstanding flange and spaced projections at the edge of said flange, each said projection having a hole to receive a conduit connection, at least one of the projections having an inturned ear with a threaded aperture, the spaces between the projections affording upwardly open passage for wires essentially in the plane of said conduit connections; the cover member having a closing portion and a skirt portion surrounding the said projections and overlapping said flange, said skirt portion having notches extending from its lower edge larger than but aligned with said holes so that the skirt may be applied over the base member after conduit connectors are secured in said holes; said cover member having an aperture extending through the closing portion, and a securing screw passing through said cover aperture and engaged in said threaded aperture.

2. An electrical wiring box as in claim 1, in which the cover member has integral closing and skirt portions.

3. An electrical wiring box as in claim 1, in which the skirt portion is a sleeve having an inwardly extending apertured lug at the edge opposite one of said notches, and in which the cover portion is a separate apertured plate, the securing screw passing through the plate aperture and the apertured lug and being engaged in said threaded aperture.

4. An electrical wiring box as in claim 1, in which the skirt has internal lugs for engaging the free edge of the flange to locate the cover member relative to the base member.

5. An electrical wiring box comprising a base member having a bottom with four integral projections upstanding therefrom at the edges thereof and spaced at 90° from one another, each said projection having a hole to rigidly receive a conduit connection, two diametrically opposite projections having inturned ears with threaded apertures, the spaces between said projections affording upwardly open passage for wires essentially in the plane of said connections; a cover member having a skirt portion surrounding the said projections and a closing portion, said skirt portion having notches extending from its lower edge and located opposite said holes, each notch being smaller than the corresponding projection and being larger than the conduit connection engaged in the hole thereof, said skirt portion having parts engaged with the base member to limit downward axial movement of said skirt portion; said closing portion having apertures; and securing screws passing through the apertures in the closing portion and engaged in the threaded ears of said base member.

6. An electrical wiring box comprising a base member having a bottom with four integral projections upstanding therefrom at the edges thereof and spaced at 90° from one another, each said projection having a hole to rigidly receive a conduit connection, the spaces between said projections affording upwardly open passage for wires essentially in the plane of said connections; a cover member having a skirt sleeve surrounding the said projections, said skirt having notches extending from its lower edge and located opposite said holes, each notch being smaller than the corresponding projection and being larger than the conduit connection engaged in the hole thereof, said skirt having a pair of diametrically opposite inturned apertured ears, said skirt having parts engaged with the base member to limit downward axial movement of said skirt portion; a closing plate having diametrically opposed apertures and overlying said skirt portion; and securing screws passing through the apertures in the closing plate and in the skirt ears and engaged in the said base member.

7. An electrical wiring box comprising a base member and a cover member; the base member having a bottom with spaced projections upstanding therefrom, each said projection having a hole to receive a conduit connection, the spaces between the projections affording upwardly open passage for wires essentially in the plane of the conduit connections; the cover member having a closing portion and a skirt portion, said skirt portion having notches extending from its lower edge larger than but aligned with said holes so that the skirt can be telescoped with said projections after conduit connectors are secured in said holes; said cover member having an aperture extending through the closing portion, said base member having a part with a threaded aperture therein aligned with the cover aperture, and a securing screw passing through said cover aperture and engaged in said threaded aperture for holding the cover member assembled to the base member.

MAX M. LEAR, JR.

REFERENCES CITED

The following references are of record in the file of this patent:

UNITED STATES PATENTS

| Number | Name | Date |
| --- | --- | --- |
| 807,263 | Greenfield | Dec. 12, 1905 |
| 858,699 | Bossert | July 2, 1907 |
| 1,929,218 | Sambleson | Oct. 3, 1933 |
| 2,265,926 | Pike | Dec. 9, 1941 |
| 2,374,993 | Haynes | May 1, 1945 |
| 2,420,184 | Mekelburg | May 6, 1947 |

FOREIGN PATENTS

| Number | Country | Date |
| --- | --- | --- |
| 126,535 | Austria | Jan. 25, 1932 |